United States Patent
Emberling

(10) Patent No.: US 6,741,256 B2
(45) Date of Patent: May 25, 2004

(54) PREDICTIVE OPTIMIZER FOR DRAM MEMORY

(75) Inventor: Brian D. Emberling, San Mateo, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 263 days.

(21) Appl. No.: 09/940,233

(22) Filed: Aug. 27, 2001

(65) Prior Publication Data

US 2003/0038810 A1 Feb. 27, 2003

(51) Int. Cl.⁷ .............................................. G09G 5/399
(52) U.S. Cl. ........................ 345/540; 345/557; 345/558; 711/157; 711/158; 710/113
(58) Field of Search ............................... 345/557, 558, 345/540; 711/157, 158; 710/112, 113, 114

(56) References Cited

U.S. PATENT DOCUMENTS

| | | | | | |
|---|---|---|---|---|---|
| 5,555,325 | A | * | 9/1996 | Burger | ......................... 382/309 |
| 6,167,489 | A | * | 12/2000 | Bauman et al. | .............. 711/145 |
| 6,262,748 | B1 | | 7/2001 | Deering et al. | |

* cited by examiner

*Primary Examiner*—Kee M. Tung
*Assistant Examiner*—Mackly Monestime
(74) *Attorney, Agent, or Firm*—Meyertons Hood Kivlin Kowert & Goetzel, P.C.; Jeffrey C. Hood

(57) ABSTRACT

A predictive optimizing unit for use with an interleaved memory and suitable for use in a computer graphics system is described. The unit maintains a queue of pending requests for data from the memory, and prioritizes precharging and activating interleaves with pending requests. Interleaves which are in a ready state may be accessed independently of the precharging and activation of non-ready interleaves.

24 Claims, 9 Drawing Sheets

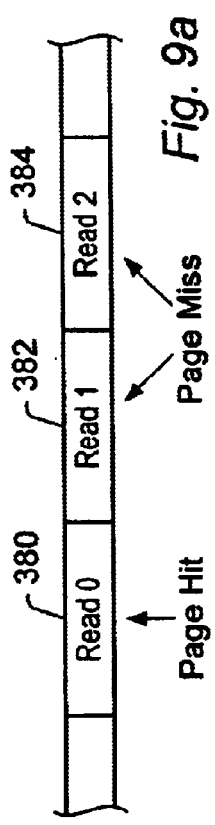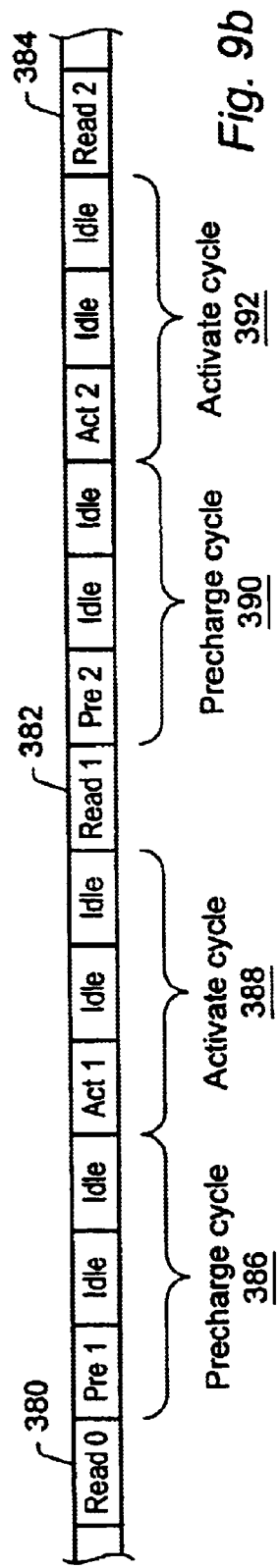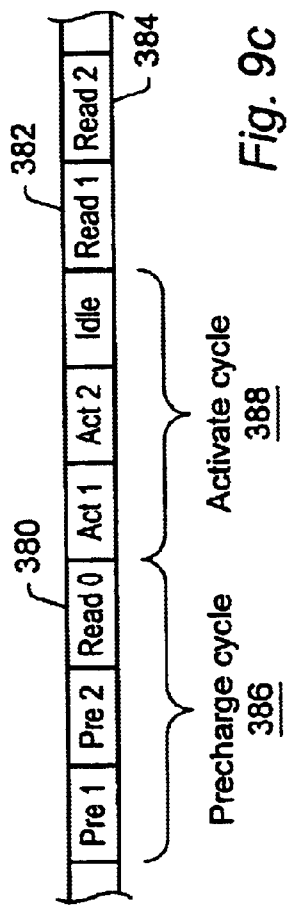

PREDICTIVE OPTIMIZER FOR DRAM MEMORY

BACKGROUND OF THE INVENTION

1. Field of the Invention

This invention relates generally to the field of computer graphics and, more particularly, to texture buffer and controller architecture.

2. Description of the Related Art

With each new generation of graphics system, there is more image data to process and less time in which to process it. This consistent increase in data and data rates places additional burden on the memory systems that form an integral part of the graphics system. Attempts to further improve graphics system performance are now running up against the limitations of these memory systems in general, and memory device limitations in particular.

One example of a memory sub-system defining the upper limit of overall system performance may be the texture buffer of a graphics system. Certain graphics applications such as 3D modeling, virtual reality viewers, and video games may call for the application of an image to a geometric primitive in lieu of a procedurally generated pattern, gradient or solid color. In these applications, geometric primitives carry additional mapping data (e.g., a UV, or UVQ map) which describes how the non-procedural data is to be applied to the primitive. To implement this type of function, a graphics system may employ a texture buffer to store two dimensional image data representative of texture patterns, "environment" maps, "bump" maps, and other types of non-procedural data.

During the rendering process, the mapping data associated with a primitive may be used to interpolate texture map addresses for each pixel in the primitive. The texture map addresses may then be used to retrieve the portion of non-procedural image data in the texture buffer to be applied to the primitive. In some cases (e.g., photo-realistic rendering) a fetch from the texture buffer may result in a neighborhood or tile of texture pixels or texels to be retrieved from the texture buffer and spatially filtered to produce a single texel. In these cases, four or more texels may be retrieved for each displayed pixel, placing a high level of demand on the texture buffer. Thus, poor performance of the texture buffer is capable of affecting a cascading degradation through the graphics system, stalling the render pipeline, and increasing the render or refresh times of displayed images.

In some cases, dynamic random access memory (DRAM) devices may be used to implement a texture buffer as they are generally less expensive and occupy less real estate than static random access memory (SRAM) alternatives. However, DRAM devices have inherent factors such as pre-charge times, activation times, refresh periods, and others which may complicate integration into high bandwidth applications (e.g., high performance graphics systems). Recent advances in DRAM technology, including the introduction of new families (e.g., SDRAM) have increased the throughput of DRAM memories, but have not overcome all of these performance hurdles. Economically, the use of DRAM devices in graphics systems is still desirable, and possible if the above mentioned performance limiting factors can be mitigated through consideration of certain features unique to graphics systems (e.g., memory bandwidth has a higher priority than memory latency). For these reasons, a system and method for optimizing the utilization of DRAM memory sub-systems as employed in graphics systems is desired.

SUMMARY OF THE INVENTION

The problems set forth above may at least in part be solved in some embodiments by a system or method for optimizing a DRAM memory system through the employment of a request queue and memory status registers. In one embodiment, the system may include an interleaved memory of DRAM devices configured to receive, store, and recall image data. A request queue may be configured to receive and store pending requests for data from the memory, and a set of status registers may be configured to indicate the state of each interleave in the memory. A memory controller may be connected to the request queue, the status registers, and the memory. The memory controller may be configured to search the request queue for pending requests for data from each of the interleaves, and query the status registers to determine whether the interleaves are ready to be accessed. If there is a pending request targeted for an interleave which is not ready for access, the memory controller may assign urgent priority to precharging and activating that interleave. The memory controller may also remove requests from the request queue and issue them to interleaves that are ready for access, independent of the precharging and activation of non-ready interleaves.

As noted above, a method for optimizing a DRAM memory system through the employment of a request queue and memory status register is also contemplated. In one embodiment, the method includes maintaining a list of pending requests for data from the memory, and maintaining a status report for each interleave of the memory. The information in the status report may describe a given interleave as precharging, precharged, or active. The list of pending requests may be scanned for requests for data from each interleave in the memory. For each interleave, the request least recently added to the request queue may be chosen, and the interleave page address extracted from the request. Next, the associated status report may be examined to determine the state of the interleave. If the status report indicates that the interleave is active with the wrong row, then a command may be issued to begin a precharge cycle on the interleave. If the status report indicates that the interleave is precharged, then a command may be issued to activate the interleave, thus making the page address of the request the active page. If the status report indicates that the interleave is precharging, then no command may be issued. The request that was least recently sent to the request queue may then be removed from the request queue and issued to the associated interleave if the interleave is currently in an active state.

BRIEF DESCRIPTION OF THE DRAWINGS

The foregoing, as well as other objects, features, and advantages of this invention may be more completely understood by reference to the following detailed description when read together with the accompanying drawings in which:

FIG. 9 is a diagrammatic illustration of one sequence of memory requests and the resulting sequence of texture buffer commands.

Figure 1:
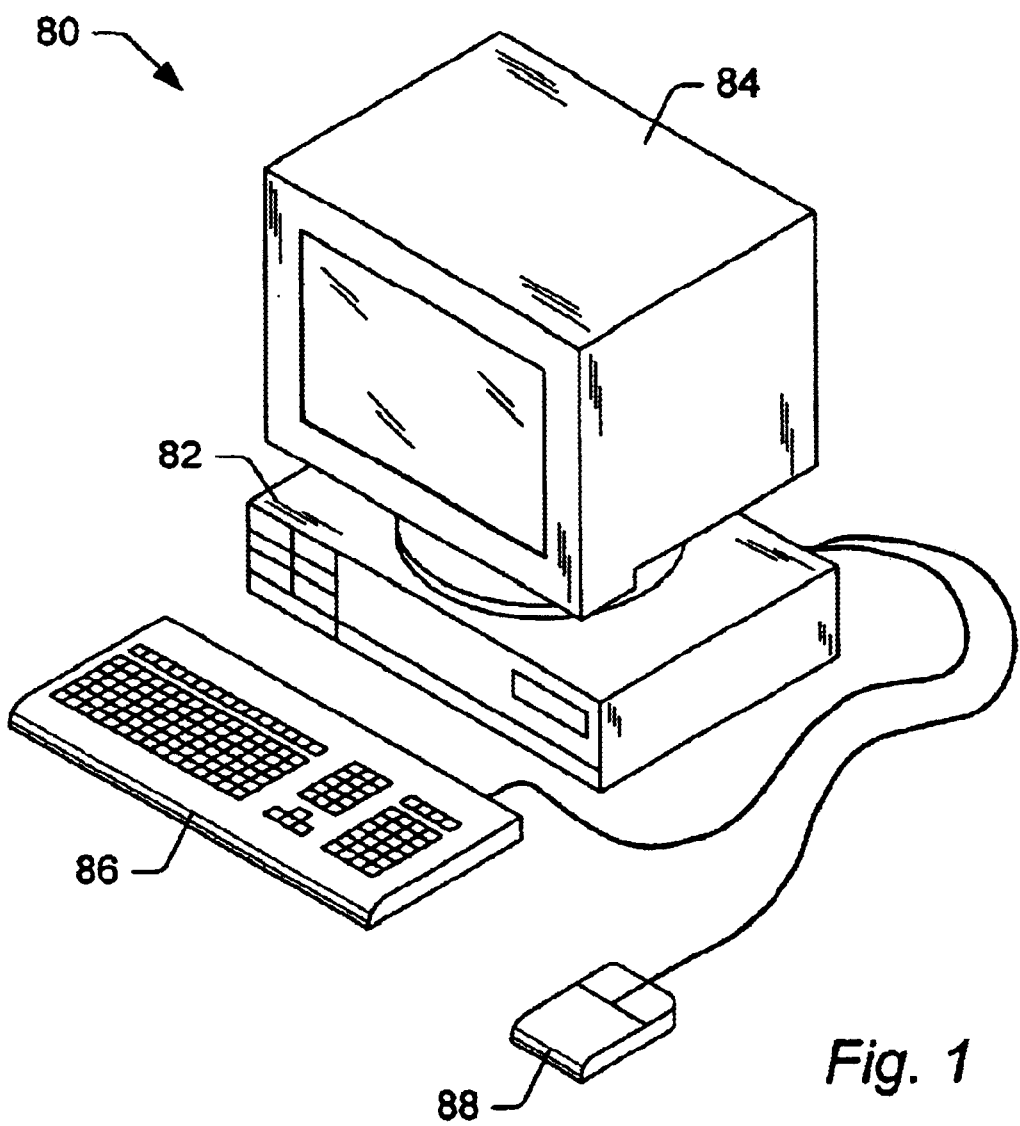
FIG. 1 is a perspective view of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Please note that the section headings used herein are for organizational purposes only and are not meant to limit the description or claims. The word "may" is used in this application in a permissive sense (i.e., having the potential to, being able to), not a mandatory sense (i.e., must). Similarly, the word include, and derivations thereof, are used herein to mean "including, but not limited to."

DETAILED DESCRIPTION OF THE PREFERRED EMBODIMENTS

Computer System—FIG. 1

Referring now to FIG. 1, one embodiment of a computer system 80 that includes a graphics system that may be used to implement one embodiment of the invention is shown. The graphics system may be comprised in any of various systems, including a computer system, network PC, Internet appliance, a television, including HDTV systems and interactive television systems, personal digital assistants (PDAs), virtual reality systems, and other devices which display 2D and or 3D graphics, among others.

As shown, the computer system 80 comprises a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
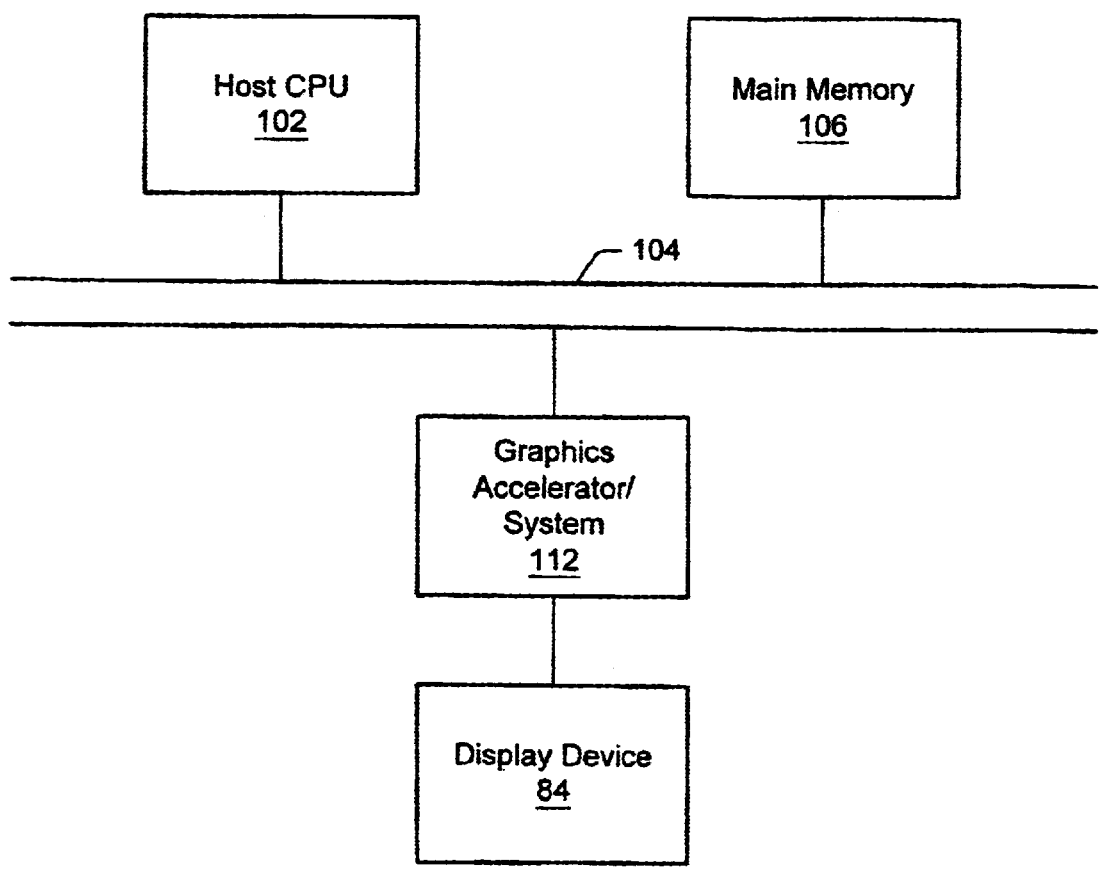
FIG. 2 is a simplified block diagram of one embodiment of a computer system.

Computer System Block Diagram—FIG. 2

Referring now to FIG. 2, a simplified block diagram illustrating the computer system of FIG. 1 is shown. Elements of the computer system that are not necessary for an understanding of the present invention are not shown for convenience. As shown, the computer system 80 includes a central processing unit (CPU) 102 coupled to a high-speed memory bus or system bus 104 also referred to as the host bus 104. A system memory 106 may also be coupled to high-speed bus 104.

Host processor 102 may comprise one or more processors of varying types, e.g., microprocessors, multi-processors and CPUs. The system memory 106 may comprise any combination of different types of memory subsystems, including random access memories, (e.g., static random access memories or "SRAMs," synchronous dynamic random access memories or "SDRAMs," and Rambus dynamic random access memories or "RDRAM," among others) and mass storage devices. The system bus or host bus 104 may comprise one or more communication or host computer buses (for communication between host processors, CPUs, and memory subsystems) as well as specialized subsystem buses.

In FIG. 2, a graphics system 112 is coupled to the high-speed memory bus 104. The 3-D graphics system 112 may be coupled to the bus 104 by, for example, a crossbar switch or other bus connectivity logic. It is assumed that various other peripheral devices, or other buses, may be connected to the high-speed memory bus 104. It is noted that the graphics system may be coupled to one or more of the buses in computer system 80 and/or may be coupled to various types of buses. In addition, the graphics system may be coupled to a communication port and thereby directly receive graphics data from an external source, e.g., the Internet or a network. As shown in the figure, one or more display devices 84 may be connected to the graphics system 112 comprised in the computer system 80.

Host CPU 102 may transfer information to and from the graphics system 112 according to a programmed input/output (I/O) protocol over host bus 104. Alternately, graphics system 112 may access the memory subsystem 106 according to a direct memory access (DMA) protocol or through intelligent bus mastering.

A graphics application program conforming to an application programming interface (API) such as OpenGL or Java 3D may execute on host CPU 102 and generate commands and data that define a geometric primitive (graphics data) such as a polygon for output on display device 84. As defined by the particular graphics interface used, these primitives may have separate color properties for the front and back surfaces. Host processor 102 may transfer this graphics data to memory subsystem 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including the host CPU 102 and/or the system memory 106, other memory, or from an external source such as a network, e.g., the Internet, or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain elements of the illustrated graphics system 112 may be implemented in software.

Figure 3:
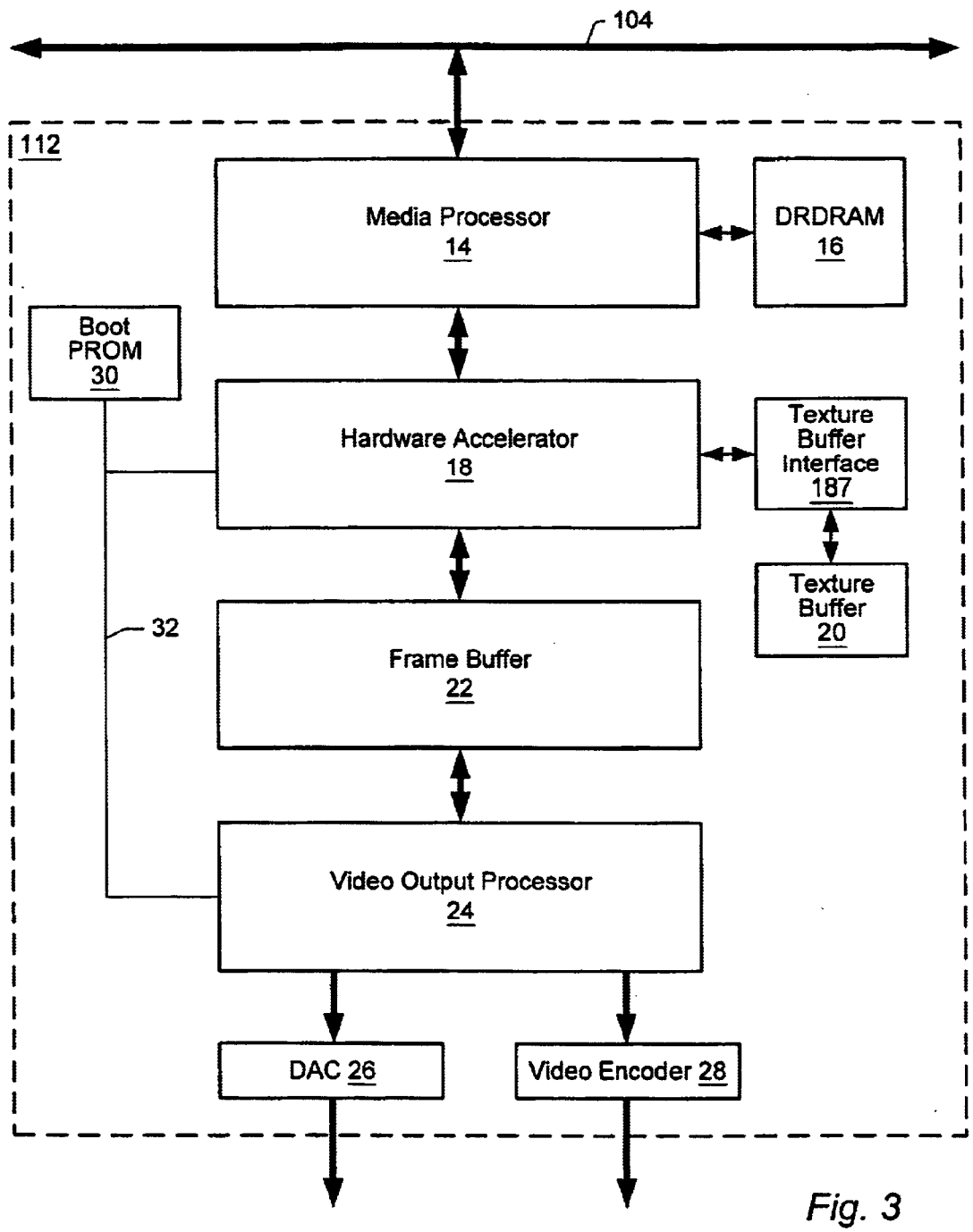
FIG. 3 is a functional block diagram of one embodiment of a graphics system.

Graphics System—FIG. 3

Referring now to FIG. 3, a functional block diagram illustrating one embodiment of graphics system 112 is shown. Note that many other embodiments of graphics system 112 are possible and contemplated. Graphics system 112 may comprise one or more media processors 14, one or more hardware accelerators 18, one or more texture buffers 20, one or more frame buffers 22, and one or more video output processors 24. Graphics system 112 may also comprise one or more output devices such as digital-to-analog converters (DACs) 26, video encoders 28, flat-panel-display drivers (not shown), and/or video projectors (not shown). Media processor 14 and/or hardware accelerator 18 may be any suitable type of high performance processor (e.g., specialized graphics processors or calculation units, multimedia processors, DSPs, or general purpose processors).

In some embodiments, one or more of these components may be removed. For example, the video output processor may not be included in an embodiment that does not provide video output signals to drive a display device. In other embodiments, all or part of the functionality implemented in either or both of the media processor or the graphics accelerator may be implemented in software.

In some embodiments, media processor 14 and hardware accelerator 18 may be comprised within the same integrated circuit. In other embodiments, portions of media processor 14 and/or hardware accelerator 18 may be comprised within separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Each functional block of graphics system 112 is described in more detail below.

Figure 4:
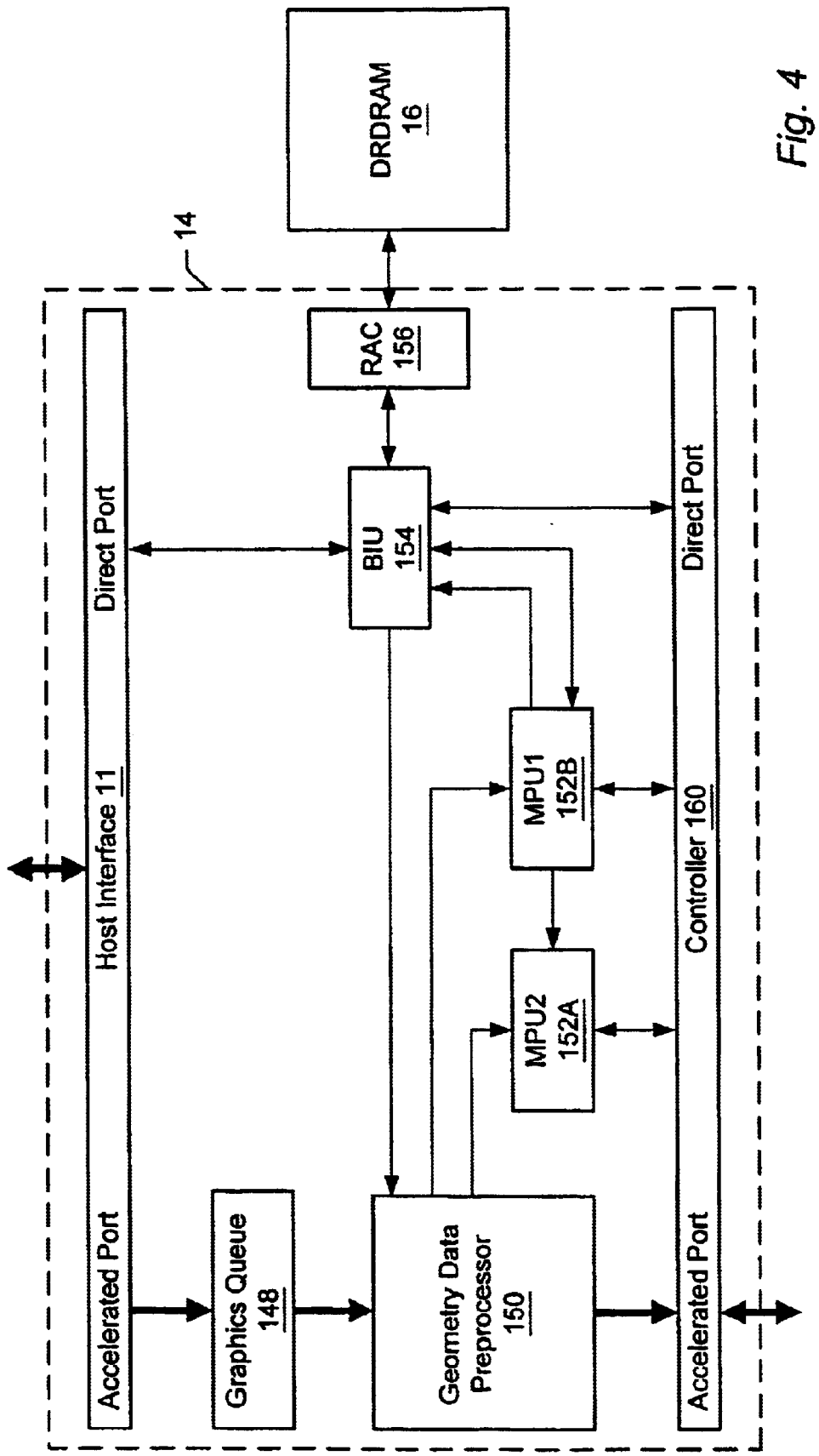
FIG. 4 is a functional block diagram of one embodiment of the media processor of FIG. 3.

Media Processor—FIG. 4

FIG. 4 shows one embodiment of media processor 14. As shown, media processor 14 operates as the interface between graphics system 112 and computer system 80 by controlling the transfer of data between graphics system 112 and computer system 80. In some embodiments, media processor 14 may also be configured to perform transform, lighting, and/or other general-purpose processing on graphical data.

Transformation refers to manipulating an object and includes translating the object (i.e., moving the object to a different location), scaling the object (i.e., stretching or shrinking), and rotating the object (e.g., in three-dimensional space, or "3-space").

Lighting refers to calculating the illumination of the objects within the displayed image to determine what color and or brightness each individual object will have. Depending upon the shading algorithm being used (e.g., constant, Gourand, or Phong), lighting may be evaluated at a number of different locations. For example, if constant shading is used (i.e., each pixel of a polygon has the same lighting), then the lighting need only be calculated once per polygon. If Gourand shading is used, then the lighting is calculated once per vertex. Phong shading calculates the lighting on a per-pixel basis.

As illustrated, media processor 14 may be configured to receive graphical data via host interface 11. A graphics queue 148 may be included in media processor 14 to buffer a stream of data received via the accelerated port of host interface 11. The received graphics data may comprise one or more graphics primitives. As used herein, the term graphics primitive may include polygons, parametric surfaces, splines, NURBS (non-uniform rational B-splines), sub-divisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transform and lighting calculations and programmable functions and to send results to hardware accelerator 18. MPUs 152 may also have read/write access to texels (i.e. the smallest addressable unit of a texture map, which is used to "wallpaper" a three-dimensional object) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to a memory. For example, as shown, media processor 14 may include direct Rambus interface 156 to a direct Rambus DRAM (DRDRAM) 16. A memory such as DRDRAM 16 may be used for program and data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface, such as bus interface unit (BIU) 154, which provides a direct port path to memory 16 and to hardware accelerator 18 and video output processor 24 via controller 160.

Figure 5:
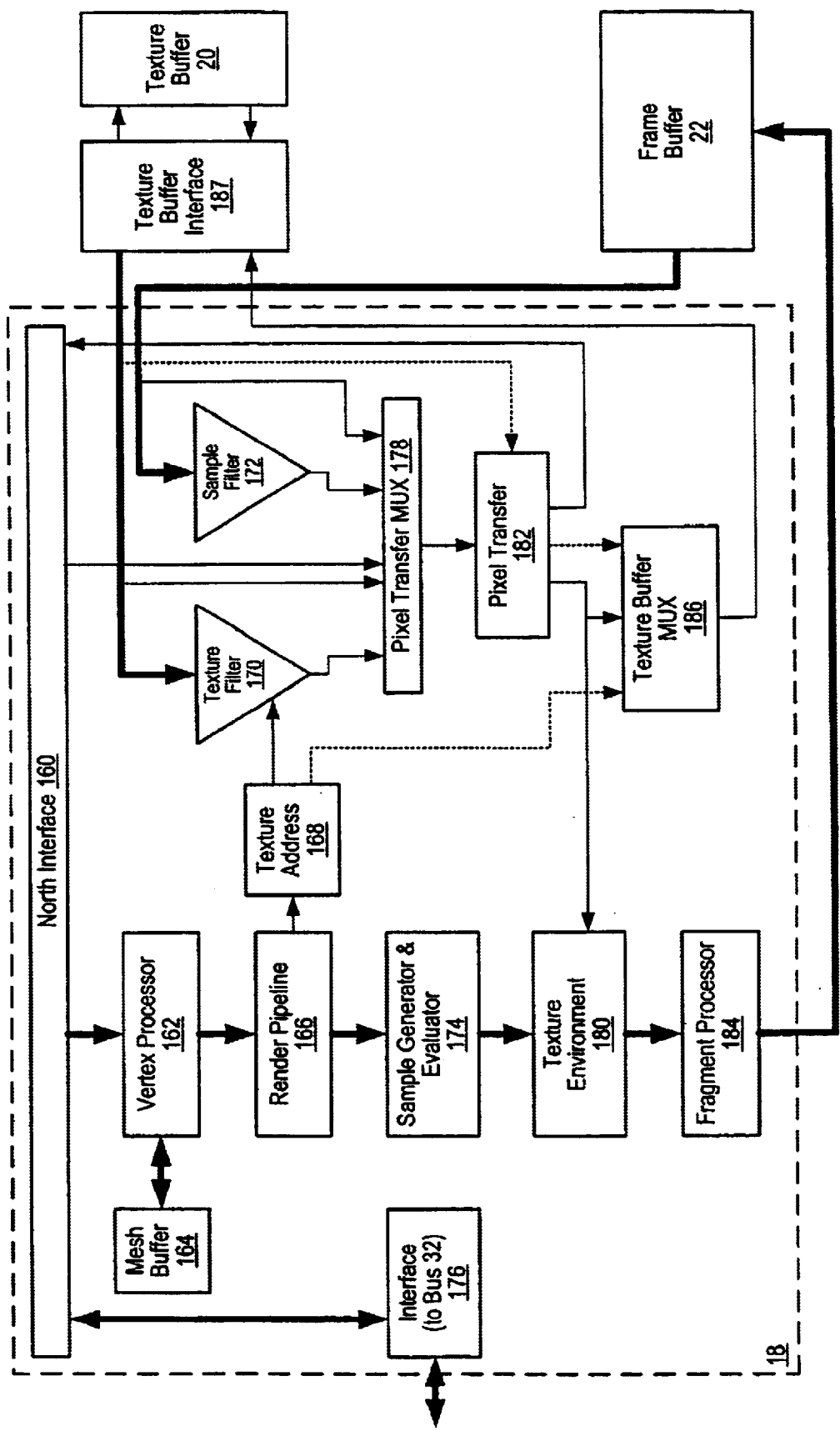
FIG. 5 is a functional block diagram of one embodiment of the hardware accelerator of FIG. 3.

Hardware Accelerator—FIG. 5

One or more hardware accelerators 18 may be configured to receive graphics instructions and data from media processor 14 and then to perform a number of functions on the received data according to the received instructions. For example, hardware accelerator 18 may be configured to perform rasterization, 2D or 3D texturing, pixel transfers, imaging, fragment processing, clipping, depth cueing, transparency processing, set-up, and/or screen space rendering of various graphics primitives occurring within the graphics data. Each of these features is described separately below.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window and a viewpoint located in world space. The solid truncated pyramid may be imagined as the union of all rays emanating from the viewpoint and passing through the view window. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculation performed to generate the data used to form each pixel that will be displayed. For example, hardware accelerator 18 may calculate "samples." Samples are points have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 160 (referred to as the "North Interface") to communicate with media processor 14. Hardware accelerator 18 may also be configured to receive commands from media processor 14 through this interface. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may communicate with texture buffer 20 using an eight-way interleaved texel bus that allows hardware accelerator 18 to read from and write to texture buffer 20 through the texture buffer interface 187. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to receive vertices and convert them to fragments. The render pipeline 166 may be configured to rasterize 2D window system primitives (e.g., dots, fonts, Bresenham lines, polygons, rectangles, fast fills, and BLITs (Bit Block Transfers, which move a rectangular block of bits from main memory into display memory, which may speed the display of moving objects on screen)) and 3D primitives (e.g., smooth and large dots, smooth and wide DDA (Digital Differential Analyzer) lines, triangles, polygons, and fast clear) into pixel fragments. The render pipeline 166 may be configured to handle full-screen size primitives, to calculate plane and edge slopes, and to interpolate data down to pixel tile resolution using interpolants or components such as r, g, b (i.e., red, green, and blue vertex color); r2, g2, b2 (i.e., red, green, and blue specular color from lit textures); a (alpha); and z, s, t, r, and w (texture components).

In embodiments using supersampling, the sample generator 174 may be configured to generate samples from the fragments output by the render pipeline 166 and to determine which samples are inside the rasterization edge. Sample positions may be defined in loadable tables to enable stochastic sampling patterns.

Hardware accelerator 18 may be configured to write textured fragments from 3D primitives to frame buffer 22. The render pipeline 166 may send pixel tiles defining r, s, t and w to the texture address unit 168. The texture address unit 168 may determine the set of neighboring texels that are addressed by the fragment(s), as well as the interpolation coefficients for the texture filter, and request texels from the texture buffer 20 through the texture buffer interface 187. The texture buffer 20 may be interleaved to obtain as many neighboring texels as possible in each clock. The texture filter 170 may perform bilinear, trilinear or quadlinear interpolation. The pixel transfer unit 182 may also scale and bias and/or lookup texels. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 160, select channels from either the frame buffer 22 or the texture buffer 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions. Depending on the source of and operations performed on the processed data, the pixel transfer unit 182 may then output the data to the texture buffer 20 (via the texture buffer MUX 186 and texture buffer interface 187), the frame buffer 22 (via the texture environment unit 180 and the fragment processor 184), or to the host (via north interface 160). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may then output data to either the texture buffer 20 (via the texture buffer interface 187) or the frame buffer 22.

Fragment processor 184 may be used to perform standard fragment processing operations such as the OpenGL fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Buffer Interface—187

In the illustrated embodiment, the texture buffer interface 187 controls the flow of texture data into and out of the texture buffer 20. In some embodiments, the texture buffer interface 187 may fetch a neighborhood or tile of texels (i.e., an array of texture elements) from the texture buffer 20 in response to a single base address. Additionally, the texture buffer interface 187 may be configured to handle edge conditions (i.e., addressing texels near or beyond the edge of a stored image or texture) by effecting address wrapping, or repeating edge texels. The texture buffer interface 187 may also sort requests for texels from the texture buffer multiplexer (MUX) 186 and reschedule these requests to mitigate penalties associated with page misses within the texture buffer 20.

Texture Buffer—20

Texture buffer 20 may include several SDRAMs. Texture buffer 20 may be configured to store texture maps, image processing buffers, and accumulation buffers for hardware accelerator 18. Texture buffer 20 may have many different capacities (e.g., depending on the type of SDRAM included in texture buffer 20). In some embodiments, each pair of SDRAMs may be independently row and column addressable.

Frame Buffer 22

Graphics system 112 may also include a frame buffer 22. In one embodiment, frame buffer 22 may include multiple 3DRAM64s. Frame buffer 22 may be configured as a display pixel buffer, an offscreen pixel buffer, and/or a supersample buffer. Furthermore, in one embodiment, certain portions of frame buffer 22 may be used as a display pixel buffer, while other portions may be used as an offscreen pixel buffer and supersample buffer.

Video Output Processor

In some embodiments, a video output processor 24 may buffer and process pixels output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency, plane group extraction, gamma correction, pseudocolor or color lookup or bypass, and/or cursor generation. In one embodiment, frame buffer 22 may include multiple 3DRAM64 devices that include the transparency overlay function and all or some of the lookup tables. Video output processor 24 may also be configured to support two video output streams to two displays using the two independent video raster timing generators. For example, one raster (e.g., 196A) may drive a 1280×1024 CRT while the other (e.g., 196B) may drive a NTSC or PAL device with encoded television video.

In one embodiment, the video output processor 24 may directly output digital pixel data in lieu of analog video signals. This may be useful when a display device is based on a digital technology (e.g., an LCD-type display or a digital micro-mirror display).

The in one embodiment, video output processor 24 may be configured to output separate red, green, and blue analog signals to a display device such as a cathode ray tube (CRT) monitor. In some embodiments, the video output processor 24 may be configured to provide a high resolution RGB analog video output at dot rates of 240 MHz. In some embodiments, the video output processor 24 may also include an encoder configured to supply an encoded video signal to a display (e.g., encoded NTSC or PAL video).

Figure 6:
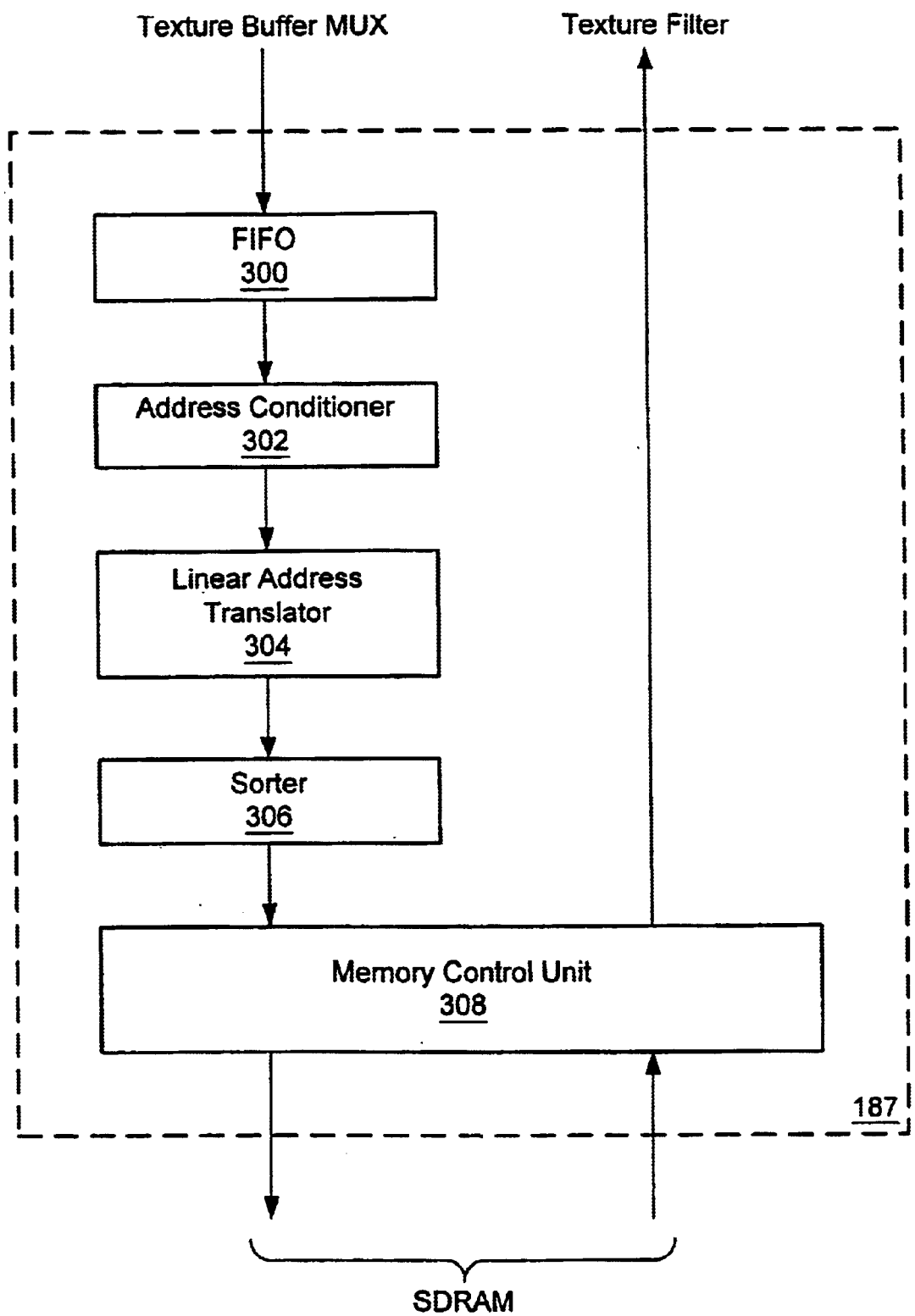
FIG. 6 is a simplified block diagram of one embodiment of the texture buffer interface of FIG. 5.

Turning now to FIG. 6, one embodiment of the texture buffer interface 187 is illustrated. In the illustrated embodiment, requests from the texture buffer MUX 186 are received and buffered in a FIFO memory 300. These requests may take the form of a base address for a neighborhood or tile of texels. The FIFO 300 may compensate for small differences in the instantaneous generation rate of requests and the rate at which the requests may be processed by the memory control unit 308 and the texture buffer 20. In some embodiments, the FIFO 300 may also be configured to present two requests to the address conditioner 302 simultaneously. In these cases, the address conditioner 302 may choose to remove one or two requests from the FIFO 300 dependent on the feasibility of to processing the two requests in parallel.

The address conditioner 302 removes requests from the FIFO 300 and may perform one or more functions on the addresses of the requested texels. In some embodiments, the address conditioner 302 may examine two requests from the FIFO 300 and determine whether or not the requests may be paired and processed in parallel. This pairing may be accomplished according to rules linked to the specific hardware implementation. Such rules may include testing for page boundary crossings within the texture buffer 20, verifying the requests to be paired are not targeted to the same physical memory device in the texture buffer 20, and others. The address conditioner 302 may also be configured to handle edge conditions (i.e., texels requested near or beyond the edges of the texture image). In some cases, the address conditioner 302 may clip addresses at the edge of a texture image so that all requests beyond the edge of a texture image will return the texel or texels which define the edge. In other cases, the address conditioner 302 may handle requests beyond the edge of a texture image by repeating valid addresses (i.e., addresses that lie completely within the defined edges of the texture image) and in so doing, create a tiled texture across the face of the geometric primitive being rendered.

In one embodiment, the linear address translator 304 may receive a conditioned request from the address conditioner 302. If the received request represents the base address of a neighborhood or tile of texels, the linear address translator 304 may generate a unique address for each texel in the tile. In some embodiments, the addresses passed to the linear address translator 304 will be relative to the origin of a texture image. In these cases, the linear address translator 304 will translate the addresses into the linear address space of the texture buffer 20 according to the size of texture images stored, and any physical constraints of the memory.

In some embodiments, the addresses generated in the linear address translator 304 may be sent to a sorter 306. The sorter 306 may examine the linear addresses received from the linear address translator 304 and convey each texel address to the correct partition of the texture buffer 20 as defined by physical structure of the memory. For example, some embodiments of the texture buffer 20 may call for the partitioning of the total storage capacity into banks. Furthermore, the texture buffer 20 and texture buffer interface 187 may be designed to allow simultaneous access to all partitions (e.g., an interleaved memory design). In these examples, the sorter 306 may group the linear addresses into sets, where each set is composed of one address per memory bank and no two addresses in the set are targeted to the same bank (i.e., bank conflicts may be prevented).

In some embodiments, the memory control unit 308 may receive the sorted linear addresses from the sorter 306. The memory control unit 308 may buffer the received addresses and reschedule them in order to mitigate performance degradation in the texture buffer 20 due to page misses. The memory control unit 308 may also be configured to schedule memory refreshes and provide a pathway for texels read from the texture buffer 20 and conveyed to the texture filter 170.

Figure 7:
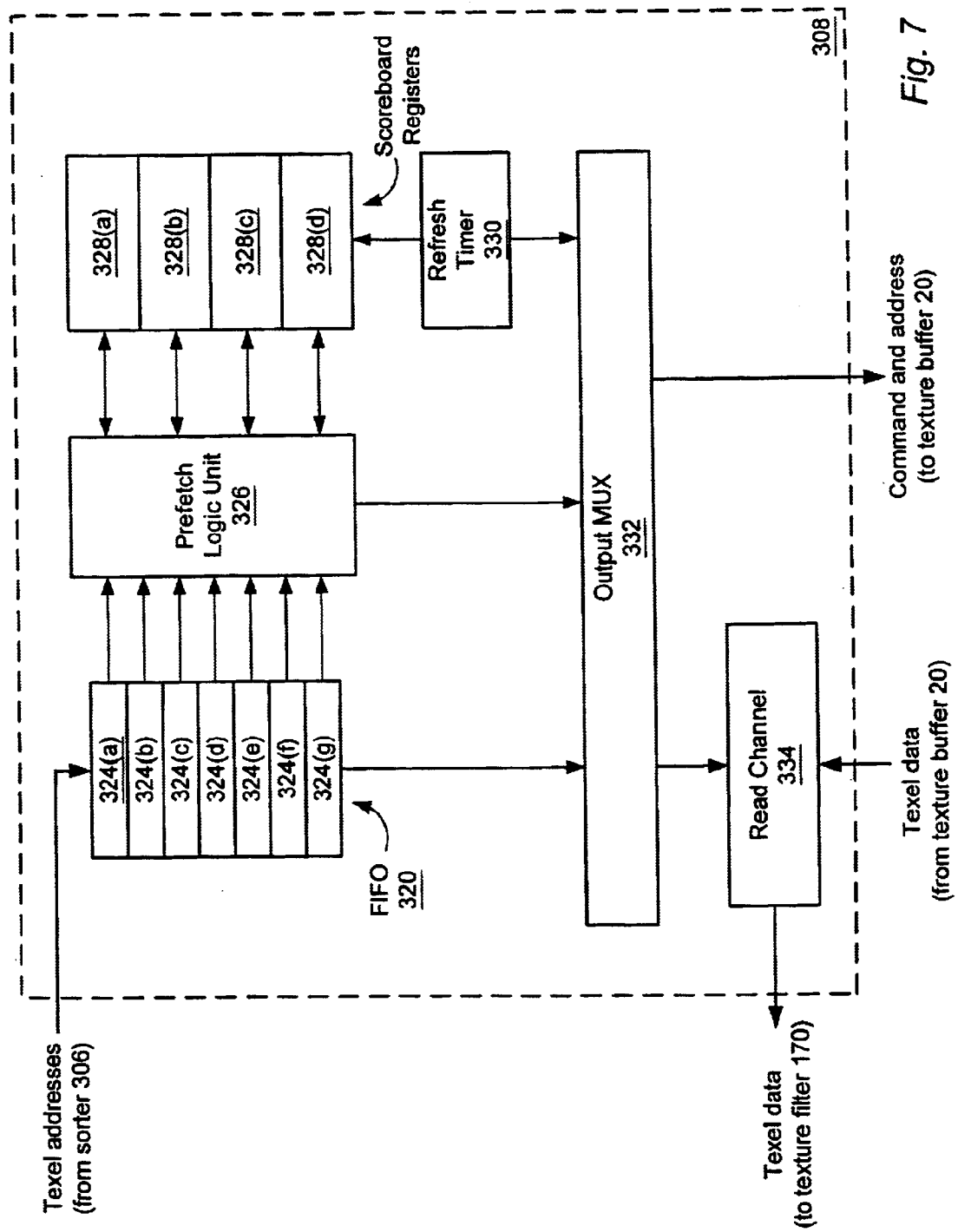
FIG. 7 is a functional block diagram of one embodiment of the memory control unit of FIG. 6.

Turning now to FIG. 7, a simplified block diagram of one embodiment of the memory control unit 308 is illustrated. In this example, the texel addresses from the sorter 306 may be received and placed in the first available entry 324 of a FIFO 320. The FIFO 320 may buffer the texel addresses until the texture buffer 20 is available to respond to new requests. In the illustrated embodiment, the FIFO 320 may also provide parallel outputs of the stored entries 324.

In some embodiments, scoreboard registers 328 may be configured to track the status of partitions within the texture buffer 20. In the illustrated embodiment, it is assumed that the texture buffer 20 architecture allows for four banks of DRAM memory devices, and the memory devices comprising each bank share common row addressing. In this example, four scoreboard registers 328 may be adequate to track the status of the memory and identify the state of each bank as being one of the following; precharging, precharged or active. The scoreboard register 328 may also incorporate a precharging timer in some embodiments. An associated precharging timer may be set when a bank begins a precharging operation, and as the timer counts down to zero the scoreboard register 328 may be automatically updated to indicate the bank state as precharged.

In the illustrated embodiment, a prefetch logic unit 326 may be configured to examine the pending texel requests (i.e., texel addresses) in the FIFO 320. In examining the pending requests, the prefetch logic unit 326 may also consider the state information stored in the scoreboard registers 328. Combining these two sources of information, the prefetch logic unit 326 searches for future texel requests from memory pages that are not currently active, or from devices that are precharged but not active. If the future request is the first entry in the FIFO 320 referring to the target bank, then the prefetch logic unit 326 will respond to such a future request by issuing commands in accordance to the current state of the target bank. For example, if a future texel request from row m of bank n within the texture buffer 20 is encountered and interrogation of the scoreboard register 328 associated with bank n reveals that the bank is precharged, then the prefetch logic unit may respond by issuing a command to the texture buffer 20 activating bank n and making m the active row. Similarly, if the scoreboard register 328 reveals that the target bank is active, then the prefetch logic unit may issue a command causing the bank to start precharging. Finally, if the state stored in the scoreboard register 328 indicates that the target bank is precharging, then the prefetch logic unit 326 may respond by issuing no command. The process described above may be repeated each machine cycle, and hence the texture buffer 20 may be maintained in a state of readiness within the constraints of the sequence of requests for texels generated by the render pipeline.

The refresh timer 330 may be configured to periodically issue refresh commands to the texture buffer 20. Feedback may be provided to the scoreboard registers 328, allowing the refresh timer 330 to update the stored bank states (e.g., a refresh operation performed on a bank will leave that bank in the precharged state). In some embodiments, the period of the refresh timer may be adjustable by means of a software accessible control register.

The output MUX 332 combines the outputs of the FIFO 320, the prefetch logic unit 326, and the refresh timer 330 and conveys all commands and requests to the texture buffer 20. In some embodiments, the output MUX 332 may prioritize the combination. In these cases, the refresh timer 330 may receive the highest priority, followed by the prefetch logic unit 326, and the FIFO 320, with the FIFO 320 having the lowest priority.

The read channel 334 may provide a pathway for conveying retrieved texel information from the texture buffer 20 to the texture filter 170. Some embodiments of the read channel 334 may incorporate one or more pipeline registers, and consequently receive control signals from the output MUX 332 to manage the flow of texel data.

Figure 8:
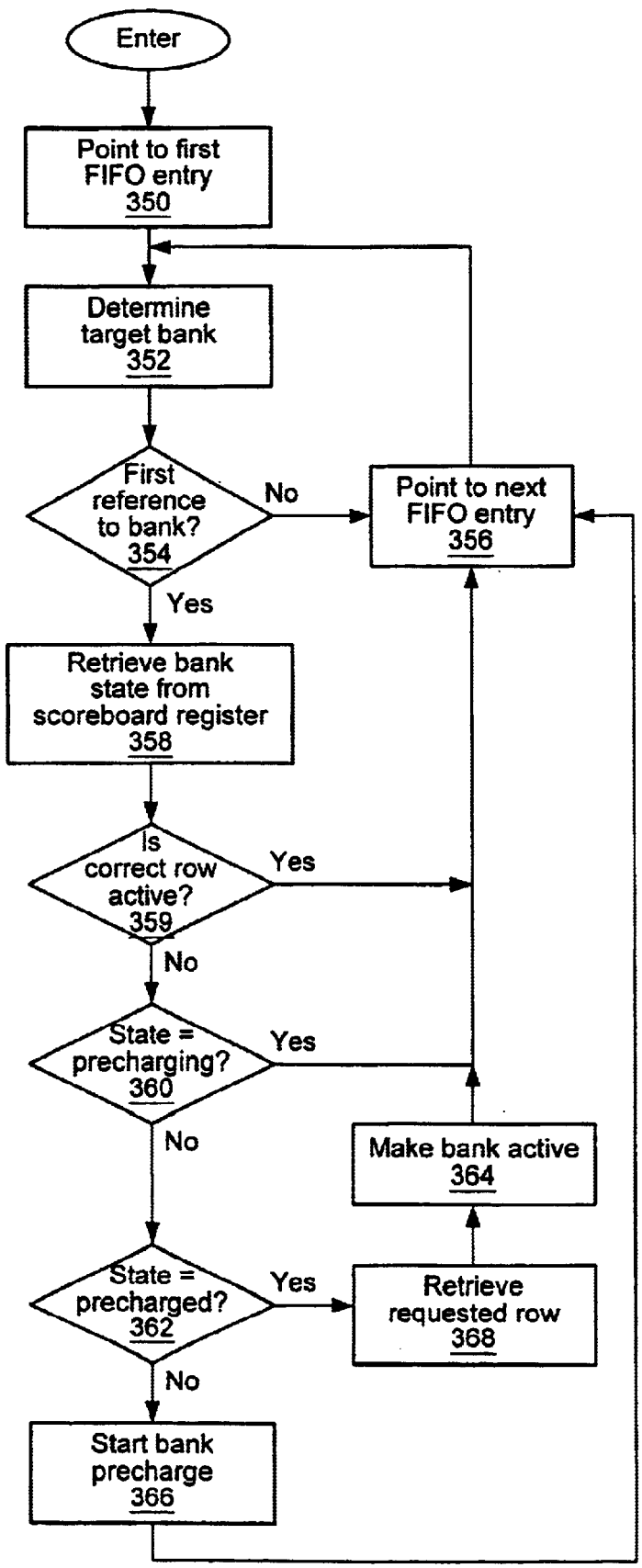
FIG. 8 is a functional block diagram of one embodiment of a method for managing the texture buffer prefetch.

Turning now to FIG. 8, a flow diagram illustrating one embodiment of a method for managing the texture buffer 20 prefetch as described above is shown. First, a pointer may be created and initialized to point to the first entry (i.e., the next entry to be removed) in the FIFO 320 (step 350). From the texel address in the FIFO entry 324, the target bank of the request may be determined (step 352). If the current FIFO entry 324 under examination does not represent the first reference to the target bank (i.e., there is another request from the target bank pending in the FIFO, and closer to the head of the FIFO) the pointer is modified to indicate the next entry (step 356), and the process branches back to step 352. If however, the current FIFO entry 324 does represent the first reference to the target bank, then the state of the target bank may be retrieved from the associated scoreboard register (step 358). The state of the target bank may first be examined to determine if the requested row is currently active (step 359). If so, then no action is called for, the pointer may be modified to indicate the next FIFO entry 324 (step 356) and the process may branch back to step 352. Next, the state of the target bank may be tested to determine if it is precharging. Precharging would indicate no action, the pointer may be modified as described above (step 356), and the process may branch back to step 352. If the state of the target bank is not precharging, then it may be further tested to determine whether it is precharged. If the state is found to be precharged, then the requested row within the target bank may be retrieved (step 368) and the target bank may be made active (step 364) with the requested row being the active row. After the target bank is activated, then the pointer may be modified (step 356) and the process may branch back to step 352. If the state of the target bank is determined not to be precharged, then it may be concluded to be active. A command may be issued to start precharging the target bank (step 366), the pointer modified (step 356) and then the process may branch back to step 352.

In some embodiments, the method described above may be implemented in dedicated hardware. In these cases, all FIFO entries 324 may be examined against the target bank states stored in the scoreboard registers 328 in a parallel operation, with one command issued (i.e., if a memory prefetch command is warranted) per machine cycle.

Turning now to FIG. 9, an example of a texel request scenario which may benefit from the method described above is illustrated. The request sequence as input to the memory control unit 308 is shown in FIG. 9a. The sequence involves three successive texel requests or texel buffer 20 reads (380, 382, 384). In this example, the second and third reads from the texture buffer 20 (382, 384) represent page misses. In FIG. 9b the sequence of commands and requests sent to the texture buffer 20 is shown as generated with no look-ahead process. The first read 380 is processed and sent to the texture buffer 20 as it represents a page hit, it may be serviced immediately. The second read 382 represents a page miss, and therefore the associated bank must be precharged and then activated before the read may be accomplished. A precharge command may be issued to the bank associated with the read 382 and then the texture buffer remains idle while waiting for the bank to precharge. The amount of precharge time required will be dependent on the particular memory devices employed in the design of the texture buffer 20, and the number of cycles representative of that time will depend on the clock period of the particular embodiment of the graphics system. In this example, three full cycles are required to issue the precharge command, and wait for the memory to become precharged. At the end of this precharge cycle 386 the bank may be issued an activate command, commencing the activate cycle 388 which also consumes three full cycles. The second read 382 may be accomplished at the end of the activate cycle 388. Similarly, the third read 384 requires a three cycle precharge 390 and three cycle activate 392 before it may be accomplished. The total number of machine cycles therefore required to accomplish the three reads in this example is 15.

FIG. 9c shows another possible sequence to accomplish the same three reads (380, 382, 384). In this example, one embodiment of the prefetch method is employed to mitigate the delays associated with the two page misses. The prefetch logic unit 326 recognized the second read 382 as constituting a page miss and received priority in issuing a precharge command to the appropriate bank of the texture buffer 20. In the next cycle, the third write was similarly recognized as a page miss and a precharge command issued. In the third cycle, the banks associated with the second and third reads (382, 384) are precharging, and the FIFO 320 is given priority to issue the next request which corresponds to the first read 380. As the two banks associated with the second and third reads (382, 384) reach the precharged state, they are issued activate commands by the prefetch logic unit 326. In this example, only one idle cycle is inserted before the second and third reads (382, 384) may be accomplished. The total number of machine cycles therefore required to accomplish the three reads in this example is 8.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the headings used herein are for organizational purposes only and are not meant to limit the description provided herein or the claims attached hereto.

What is claimed is:

1. A graphics system comprising:
   a memory configured to receive and store graphics data, wherein the memory is subdivided into banks;
   a FIFO memory configured to buffer requests for the graphics data stored in the memory;
   a set of scoreboard registers, wherein the scoreboard registers are configured to store status information representative of the state of the banks of memory, and wherein each scoreboard register is associated with one bank of the memory; and
   a prefetch logic unit connected to the FIFO, the scoreboard registers, and the memory, wherein the prefetch logic unit is configured to examine pending requests buffered in the FIFO, wherein the prefetch logic unit issues commands and addresses to the memory according to the pending requests buffered in the FIFO and the status information stored in the scoreboard registers.

2. The graphics system of claim 1, wherein the graphics data comprises texels, wherein the texels are picture elements of a texture image.

3. The graphics system of claim 1, wherein the requests for graphics data comprise base addresses of the graphics data.

4. The graphics system of claim 1, wherein the FIFO memory includes parallel outputs, wherein each parallel output conveys the contents of one entry in the FIFO to the prefetch logic unit, and wherein the number of parallel outputs is equal to the number of entries in the FIFO.

5. The graphics system of claim 4, wherein the banks of memory are further subdivided into logical pages, and wherein the FIFO parallel outputs are configured to output page addresses based on the requests for graphics data.

6. The graphics system of claim 1, wherein the scoreboard registers are further configured to indicate three states, wherein a first state indicates that the associated bank of the memory is precharging, wherein a second state indicates that the associated bank of the memory is precharged, and wherein a third state indicates that the associated bank of the memory is active.

7. The graphics system of claim 6, wherein each scoreboard register further comprises a precharging timer, wherein each precharging timer modifies the associated state of the memory stored in the scoreboard register to indicate that the associated bank of the memory is precharged in response to the timer reaching a terminal count.

8. The graphics system of claim 1, further comprising a refresh timer connected to the prefetch logic unit and the scoreboard registers, wherein the refresh timer repeatedly issues requests to initiate memory refresh cycles, and wherein the status information stored in the scoreboard registers is modified as part of the requests to initiate memory refresh cycles.

9. The graphics system of claim 1, wherein the prefetch logic unit tests the banks of memory against the buffered requests for graphics data, wherein the prefetch logic unit issues precharge and activate commands to a bank of memory in response to identifying the bank of memory as not ready to respond to a pending request for graphics data.

10. A graphics system comprising;
    an interleaved memory configured to receive, store and retrieve arrays of image data, wherein each interleave of the interleaved memory is configured to receive commands independent of the other interleaves;
    a request queue configured to store pending requests for arrays of image data;
    a set of status registers configured to store status information indicative of the status of each interleave of the interleaved memory; and
    a memory controller connected to the request queue, the status registers, and the interleaved memory and configured to convey requests for arrays of image data to the interleaved memory, and wherein the memory controller is further configured to make ready for access each interleave of the interleaved memory according to pending requests stored in the request queue.

11. The graphics system of claim 10, wherein the arrays of image data have fixed dimensions, and wherein individual elements in an array of image data are identified by the row and column in which they reside, and wherein each element in an array of image data is associated with a single interleave of the interleaved memory.

12. The graphics system of claim 10, wherein the interleaved memory comprises SDRAM devices.

13. The graphics system of claim 10, wherein the request queue comprises:
    a serial input port configured to receive addresses and store them in a set of memory locations, wherein the addresses are representative of requests for arrays of image data;
    a serial output port configured to sequentially output the addresses stored in the set of memory locations in response to a command from the memory controller, wherein the serial output port is further configured to output the least recently stored address in the set of memory locations, and wherein an address is removed from the set of memory locations as a part of conveying the address to the serial output port;
    a parallel output port configured to output a partial address for each of the interleaves in the interleaved memory, wherein the partial address represents the least recently stored address in the set of memory locations which refers to the associated interleave, and wherein the partial address further represents a row of image data within the associated interleave.

14. The graphics system of claim 10, wherein the status information stored in the set of status registers comprises:
    a current state indicator, wherein the current state indicator may assume a first value indicating that the associated interleave of the interleaved memory is in a precharging state, wherein the current state indicator may assume a second value indicating that the associated interleave of the interleaved memory is in a precharged state, and wherein the current state indicator may assume a third value indicating that the associated interleave of the interleaved memory is in an active state;
    an active row indicator configured to store a row address if the current state indicator indicates that the associated interleave of the interleaved memory is in an active state;
    a precharging timer configured to indicate the termination of a precharging cycle in the associated interleave of the interleaved memory; and an activate timer configured to indicate the termination of an activation cycle in the associated interleave of the interleaved memory.

15. The graphics system of claim 14, wherein the precharging timer is further configured to begin a countdown cycle as part of the memory controller issuing a precharge command to the associated interleave of the interleaved memory, and wherein the current state indicator is further configured to indicate that the associated interleave of the interleaved memory is in a precharged state in response to the termination of the countdown cycle of the associated precharging timer.

16. The graphics system of claim 14, wherein the activate timer is further configured to begin a countdown cycle as part of the memory controller issuing an activate command to the associated interleave of the interleaved memory, and wherein the current state indicator is further configured to indicate that the associated interleave of the interleaved memory is in an active state in response to the termination of the countdown cycle of the associated activate timer.

17. The graphics system of claim 10, wherein the memory controller prioritizes commands issued to the interleaved memory, wherein commands which prepare an interleave of the interleaved memory for future access are assigned a higher priority than commands which read image data from an interleave of the interleaved memory.

18. A method for managing accesses to an image buffer, wherein the image buffer comprises a plurality of partitions, the method comprising:
   a) maintaining a list of pending requests for data from the image buffer;
   b) maintaining a status report for each partition of the image buffer;
   c) testing the pending requests in the list of pending requests against the status report for each partition of the image buffer;
   d) readying a first partition of the image buffer for access in response to determining that there is a first pending request for image data stored in the first partition and that the first partition is not ready for access; and
   e) issuing a second pending request to the image buffer for image data stored in a second partition of the image buffer in response to determining that the second partition is ready for access;
   wherein said issuing of the second pending request to the image buffer is performed while said readying of the first partition is in progress.

19. The method of claim 18, wherein (d) is performed only for the request for image data stored in the first partition least recently added to the list of pending requests.

20. The method of claim 18, wherein (d) is performed for each partition in the image buffer.

21. The method of claim 18, wherein readying the first partition of (d) comprises:
   examining the status report associated with the first partition and determining the current state of the first partition ;
   issuing a precharge command to the first partition if the associated status report indicates that the first partition is active;
   issuing a activate command to the first partition if the associated status report indicates that the first partition is precharged; and
   issuing no command to the first partition if the associated status report indicates that the first partition is precharging.

22. A method for reducing the number of idle states in a memory having a plurality of interleaves, the method comprising:
   a) maintaining a list of pending requests for data from the interleaved memory;
   b) assigning urgent priority to bringing a first interleave of the interleaved memory to a ready status in response to determining there is a first pending request for data from the first interleave and the first interleave is not in the ready status; and
   c) independent of (b), issuing a second pending request for data to a second interleave in response to determining that the second interleave has the ready status.

23. The method of claim 22, further comprising:
   determining a page address p associated with the first pending request for data from the first interleave; and
   setting the active page of the first interleave to p as part of (b).

24. A method for managing accesses to an image buffer, wherein the image buffer comprises a plurality of partitions, the method comprising:
   a) maintaining a list of pending requests for data from the image buffer;
   b) maintaining a status report for each partition of the image buffer;
   c) testing the pending requests in the list of pending requests against the status report for each partition of the image buffer;
   d) readying a first partition of the image buffer for access in response to determining that there is a first pending request for image data stored in the first partition and that the first partition is not ready for access; and
   e) issuing requests stored in the list of pending requests to the image buffer;
   wherein readying the first partition of (d) comprises:
      examining the status report associated with the first partition and determining the current state of the first partition;
      issuing a precharge command to the first partition if the associated status report indicates that the first partition is active;
      issuing a activate command to the first partition if the associated status report indicates that the first partition is precharged; and
      issuing no command to the first partition if the associated status report indicates that the first partition is precharging.

* * * * *